US009826166B2

United States Patent
Shigemura

(10) Patent No.: US 9,826,166 B2
(45) Date of Patent: Nov. 21, 2017

(54) VEHICULAR SURROUNDING-MONITORING CONTROL APPARATUS

(71) Applicant: DENSO CORPORATION, Kariya, Aichi-pref. (JP)

(72) Inventor: Shusaku Shigemura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 215 days.

(21) Appl. No.: 14/779,538

(22) PCT Filed: Feb. 21, 2014

(86) PCT No.: PCT/JP2014/000905
§ 371 (c)(1),
(2) Date: Sep. 23, 2015

(87) PCT Pub. No.: WO2014/155953
PCT Pub. Date: Oct. 2, 2014

(65) Prior Publication Data
US 2016/0057354 A1 Feb. 25, 2016

(30) Foreign Application Priority Data
Mar. 28, 2013 (JP) .................. 2013-067702

(51) Int. Cl.
*H04N 7/18* (2006.01)
*H04N 5/232* (2006.01)
(Continued)

(52) U.S. Cl.
CPC .......... *H04N 5/23293* (2013.01); *B60R 1/00* (2013.01); *G06K 9/00791* (2013.01);
(Continued)

(58) Field of Classification Search
USPC ................................................. 348/143, 148
See application file for complete search history.

(56) References Cited

U.S. PATENT DOCUMENTS

| 2011/0140919 A1 | 6/2011 | Hara et al. |
| 2011/0199197 A1 | 8/2011 | Takatsudo et al. |

(Continued)

FOREIGN PATENT DOCUMENTS

| JP | 2005-308475 A | 11/2005 |
| JP | 2006-042147 A | 2/2006 |

(Continued)

OTHER PUBLICATIONS

International Search Report and Written Opinion dated Apr. 22, 2014 for the International Application No. PCT/JP2014/000905.

*Primary Examiner* — Nigar Chowdhury
(74) *Attorney, Agent, or Firm* — Knobbe, Martens, Olson & Bear, LLP

(57) ABSTRACT

A vehicular surrounding-monitoring control apparatus is mounted in a vehicle having an imaging unit capturing an image of surrounding and a display. The vehicular surrounding-monitoring control apparatus includes: an extraction section extracting, as an object region, an image region corresponding to each object from a captured image obtained by the imaging unit; a determining section determining whether a plurality of objects are coordinated into a group on the basis of positional relations of the object regions and types of the objects; and a display control unit displaying, when the objects are determined to be coordinated into a group, displaying a symbol image, which is specific to the group and expresses the presence of the group, so as to be superimposed on the captured image in the display.

9 Claims, 7 Drawing Sheets

(51) Int. Cl.
  *B60R 1/00*    (2006.01)
  *G06K 9/00*    (2006.01)
  *G06K 9/52*    (2006.01)
  *G06K 9/62*    (2006.01)
  *G06T 7/60*    (2017.01)
  *G06K 9/46*    (2006.01)

(52) U.S. Cl.
  CPC ..... *G06K 9/00805* (2013.01); *G06K 9/00838* (2013.01); *G06K 9/52* (2013.01); *G06K 9/6215* (2013.01); *G06K 9/6267* (2013.01); *G06T 7/60* (2013.01); *H04N 5/23219* (2013.01); *G06K 2009/4666* (2013.01)

(56) References Cited

U.S. PATENT DOCUMENTS

2012/0314074 A1   12/2012   Aimura et al.
2012/0320212 A1   12/2012   Aimura et al.

FOREIGN PATENT DOCUMENTS

| JP | 2010-128800 A | 6/2010 |
| JP | 2012-053663 A | 3/2012 |
| WO | 2014/155953 A1 | 10/2014 |

DISPLAY CYCLE IN THE CASE OF "N"

DISPLAY CYCLE IN THE CASE OF 2×N

DISPLAY CYCLE IN THE CASE OF 2×N

VEHICULAR SURROUNDING-MONITORING CONTROL APPARATUS

CROSS REFERENCE TO RELATED APPLICATION

The present disclosure is based on Japanese Patent Application No. 2013-67702 filed on Mar. 28, 2013, the disclosure of which is incorporated herein by reference.

TECHNICAL FIELD

The present disclosure relates to a vehicular surrounding-monitoring control apparatus.

BACKGROUND ART

There has been spread an apparatus for notifying of the presence of an object in a real space corresponding to an image part in an image captured by an in-vehicle camera by determining whether such image part satisfies a preset determination condition.

A vehicular recognition supporting apparatus is disclosed which not only simply notifies of the presence of an object but also makes a driver properly recognize the presence of an object having relatively high risk to the vehicle mounting with the apparatus (refer to patent literature 1). That is, an enlarged image of an object extracted from a captured image is displayed so as to be synthesized on the captured image at least when the difficulty in visibility or the degree of risk exceeds a predetermined value.

PRIOR ART LITERATURES

Patent Literature

Patent literature 1: JP 2006-042147 A

SUMMARY OF INVENTION

The configuration of the patent literature 1 may provide no problem when the number of objects captured and extracted is small, but provide some difficulty when the number of objects is large to cause an enlarged image to occupy a large part of a display image. Another object positioned in a place where the enlarged image appears would interfere with the information to be presented.

An object of the present disclosure is to provide a vehicular surrounding-monitoring control apparatus capable of more accurately notifying an occupant of information on a captured image and an object.

To achieve the above object, according to an example of the present disclosure, a vehicular surrounding-monitoring control apparatus in a vehicle is provided as follows. The vehicle includes an imaging unit that captures an image of surrounding of the vehicle and a first display. The vehicular surrounding-monitoring control apparatus includes an extraction section, a determination section, and a display control section. The extraction section extracts, as an object region, an image region corresponding to each object from a captured image obtained by the imaging unit. The determination section determines, when a plurality of object regions corresponding to a plurality of objects are extracted by the extraction section, whether the objects are coordinated into a group or not, based on types of the objects and positional relations between the object regions. The display control unit displays, when the objects are determined to be coordinated into the group, a symbol image that is specific to the group to be superimposed on the captured image in the first display, the symbol image expressing a presence of the group.

This configuration, which groups a plurality of objects, serves to prevent a symbol image from occupying a large part of a display image if the number of objects is large, thereby displaying also a region that is conventionally hidden behind an enlarged image.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
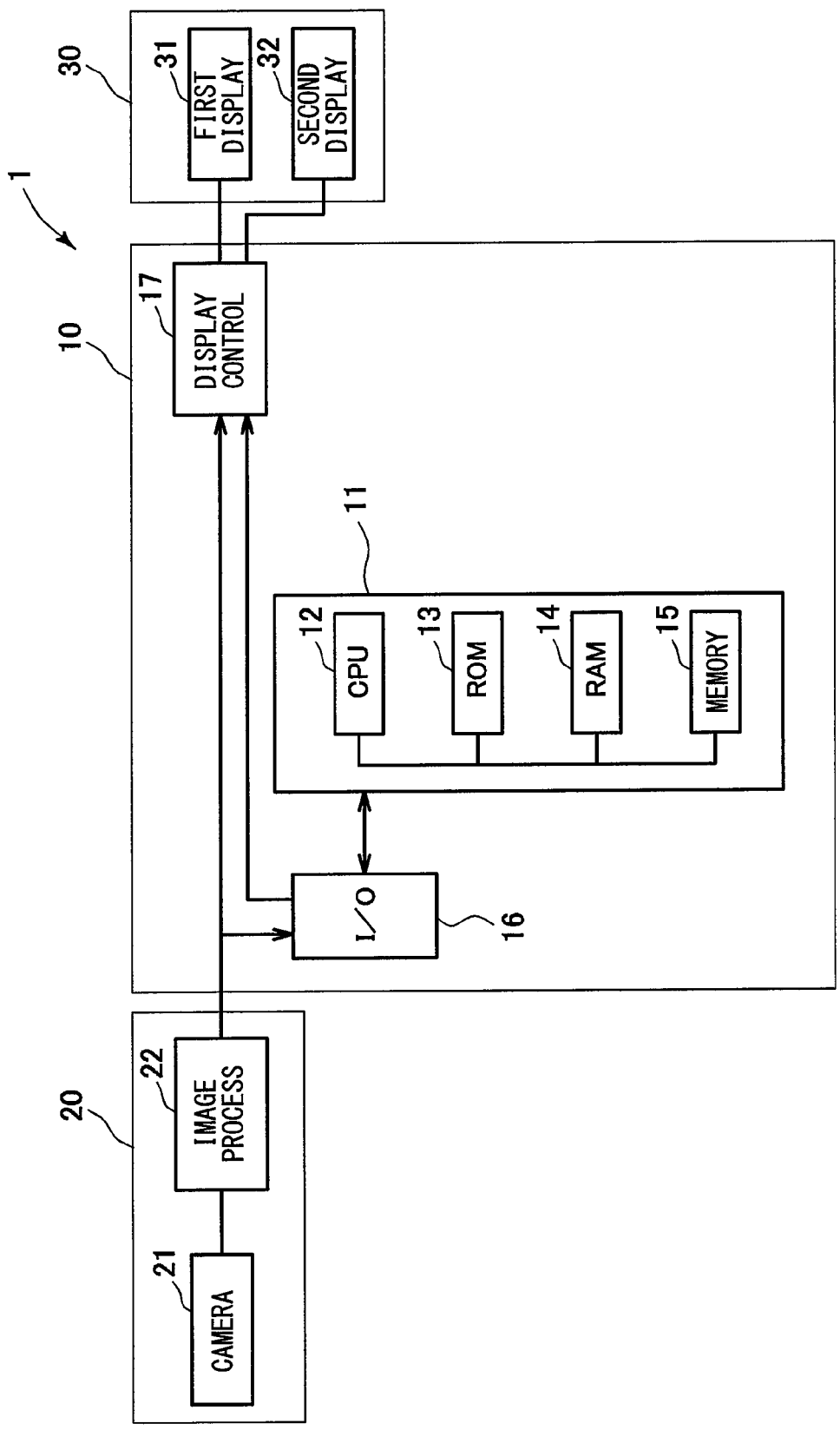
FIG. 1 is a diagram illustrating a configuration example of a vehicular surrounding-monitoring control apparatus according to an embodiment of the present disclosure.

Hereinbelow, a vehicular surrounding-monitoring control apparatus according to an embodiment of the present disclosure will be described with reference to the diagrams. A vehicular surrounding-monitoring control apparatus 1 is mounted in a vehicle. The vehicle will be mentioned as a subject vehicle or a host vehicle. As in FIG. 1, the vehicular surrounding-monitoring control apparatus 1 includes a control unit 10, an imaging unit 20 coupled to the control unit 10, and a display unit 30.

The control unit 10 includes a computer containing an arithmetic processing circuit 11 having a known CPU 12, a ROM 13 storing a control program, a RAM 14 temporarily storing data, and a memory 15 configured as a nonvolatile storage medium and storing information necessary for operation of the vehicular surrounding-monitoring control apparatus 1 (also functioning as an extraction section, a determination section, a type determination section, a visibility determination section, and an occupancy calculation section), a signal input/output circuit (abbreviated as I/O in FIG. 1) 16 coupled to the arithmetic processing circuit 11, and a display control unit 17. By executing the control program, the CPU 12 realizes various functions of the vehicular surrounding-monitoring control apparatus 1. The control unit 10 may be configured as hardware such as one or a plurality of ICs or ASICs or a part or all of the control unit 10 may be configured as software in the memory.

The signal input/output circuit 16 converts a captured image output from the imaging unit 20 to data which can be processed by the arithmetic processing circuit 11, or converts display data generated by the arithmetic processing circuit 11 to data which can be processed by the display control unit 17, outputting the resultant data.

The display control unit 17 corresponds to a so-called display driver, obtains a control instruction and display data from the arithmetic processing circuit 11, and performs display control of the display unit 30.

The imaging unit 20 includes a camera 21 (at least one of a visible camera and an infrared camera and also referred to as an imaging unit) imaging the periphery of a vehicle body (for example, in a travel direction) and an image processor 22 (also referred to as an extraction section) performing a predetermined imaging process such as filtering and binary process on the image captured by the camera 21, generating image data made by pixels in a two-dimensional array, and outputting the image data to the control unit 10. The image processor 22 may be included in the control unit 10.

The display unit 30 includes a first display 31 and a second display 32 as known LCDs. The first display 31 may be a meter display assembled in an instrument panel of a vehicle, an audio apparatus, or a navigation apparatus. The second display 32 may be a head-up display. A configuration eliminating the second display 32 may be also employed.

Figure 2:
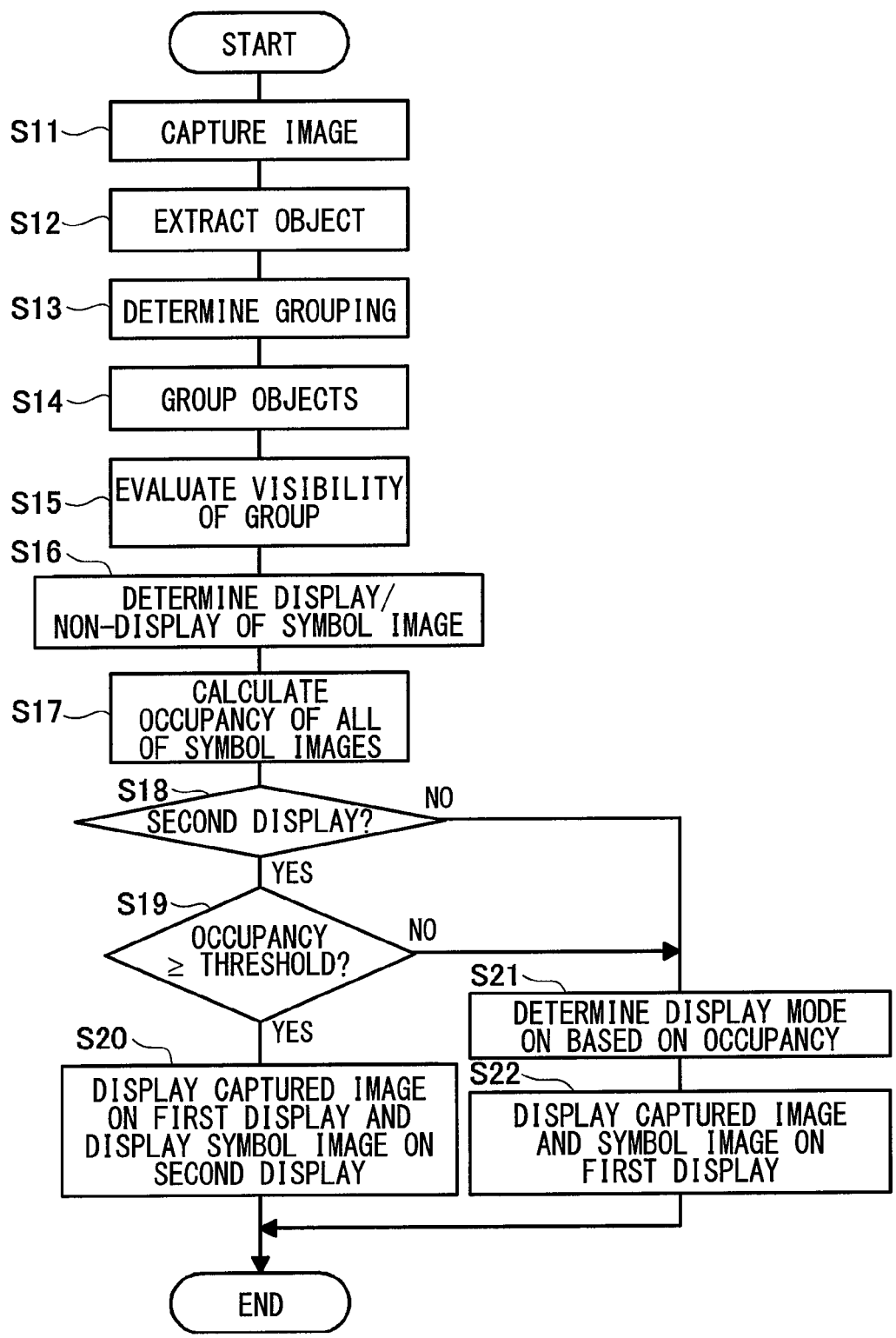
FIG. 2 is a flowchart for explaining an object displaying process.

Referring to FIG. 2, an object display process in the control program executed by the CPU 12 will be described.

It is noted that a flowchart or the processing of the flowchart in the present application includes sections (also referred to as steps), each of which is represented, for instance, as S11. Further, each section can be divided into several sub-sections while several sections can be combined into a single section. Furthermore, each of thus configured sections can be also referred to as a device, module, or means.

Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

First, the camera 21 of the imaging unit 20 captures an image ahead of the vehicle according to a control instruction from the control unit 10, for example (S11). Subsequently, the image processor 22 performs the above image process and outputs the captured image to the control unit 10.

The control unit 10 obtains the captured image and makes the arithmetic processing circuit 11 extract, as an object region, an image region corresponding to an object (for example, a living thing or a moving object) from the captured image (S12). At this time, the type of the extracted object is determined. An object type determining method is disclosed in, for example, JP 2010-108507 A or JP 2012-053663 A.

Next, when a plurality of extracted objects are present, whether the objects can be coordinated into a group is determined (S13).

Figure 3:
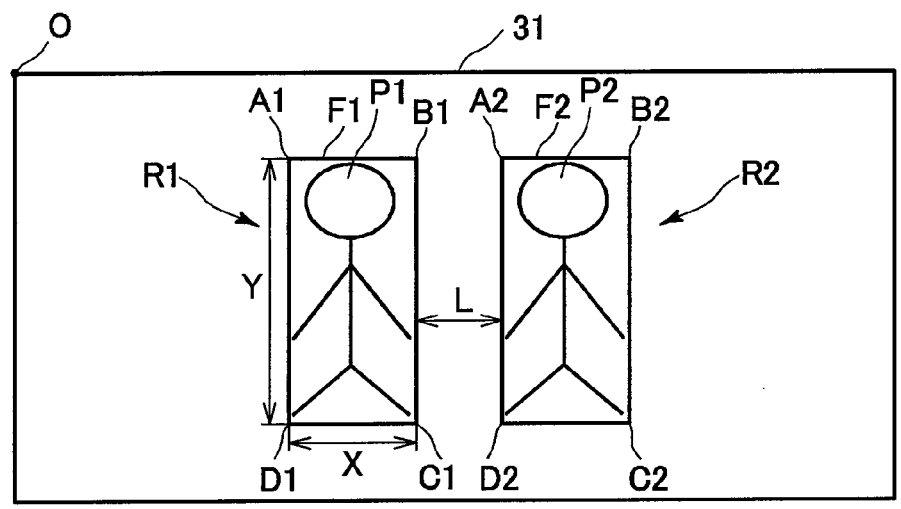
FIG. 3 is a diagram for explaining a grouping determining method.

Referring to FIG. 3, a method of determining whether objects can be grouped or not will be described. FIG. 3 illustrates an example of extracting two pedestrians (P1 and P2) as objects from a captured image. A region on the inside of a display frame F1 having an almost rectangular shape obtained by connecting four points (A1, B1, C1, and D1) surrounding the pedestrian P1 is set as an object region R1. The point A1 can be expressed as two-dimensional coordinates when the left upper corner of the screen of the first display 31 is set as an origin O. Calculating and storing length (X) of a line segment between C1 and D1 and length (Y) of a line segment between A1 and D1 enables the position (including the coordinates of the other points) and size of the object region R1 to be grasped.

Similarly, a region on the inside of a display frame F2 having an almost rectangular shape obtained by connecting four points (A2, B2, C2, and D2) surrounding the pedestrian P2 is set as an object region R2.

For example, when at least one of the points (A2, B2, C2, and D2) at the four corners of the object region R2 including the pedestrian P2 is in the object region R1 including the pedestrian P1 or, on the contrary, when at least one of the points (A1, B1, C1, and D1) at the four corners of the object region R1 is in the object region R2, that is, when the two object regions overlap, it is determined that the objects can be grouped.

The above configuration permits, when an object region overlaps another object region, the determination section to determine that a plurality of corresponding objects can be coordinated into a group. This can decrease the number of corresponding symbol images displayed, making the display region of a captured image wider than that in a conventional technique.

When the interval L between the two object regions is below a predetermined threshold, it is determined that those objects can be grouped or coordinated into a group. This configuration permits, when the interval between an object region and another object region is below a predetermined threshold, the determination section to determine that those objects can be grouped. Also the configuration serves to display a plurality of objects by one symbol image, decrease the number of symbol images, and use the display region of a captured image efficiently.

The threshold may be variable according to the size (X, Y) of an object region. For example, when an object region is relatively small such that an object is positioned at 30 m or further ahead of the vehicle, the threshold is decreased. By contrast, when an object region is relatively large such that an object is positioned within 30 m ahead of the vehicle, the threshold is increased. For example, as two pedestrians approach the vehicle (that is, the imaging unit) while keeping a predetermined distance between them, the distance (the number of pixels) between the two pedestrians in an image increases. If the threshold is constant, when the pedestrians are in a position relatively far from the vehicle, they are grouped. However, as the pedestrians are approaching the vehicle, they are not grouped. Making the threshold variable allows a relative distance in an image to be constant, providing proper grouping.

The above configuration determines the threshold according to the size of the object region. This permits objects relatively close to be assigned with respective symbol images displayed, and permits the other objects coordinated into a group to be assigned with one symbol image displayed. The number of symbol images displayed can thus be decreased, making the display region of a captured image larger than that in a conventional technique.

Even when the interval L between two object regions is larger than the threshold, grouping may be performed in the following case.

The case is that the type of one of two objects is a pedestrian and the type of the other object is an animal. This case can be estimated such that a pedestrian walks with a dog. This configuration permits the determination section to determine that two objects can be grouped when the interval between an object region and another object region is larger than a predetermined threshold and, simultaneously, the types of the two objects are different.

The above-described two configurations can prevent the objects originally estimated to be included in the same group from being determined as different groups to necessarily display a plurality of symbol images which would hide a part of a captured image.

Referring again to FIG. 2, objects are grouped on the basis of the above determination result (S14).

Next, visibility of each group is evaluated (S15). For example, the difference is calculated in brightness (so-called contrast) between an image of the pedestrian P1 (that is, an object) and an image of an object other than the pedestrian P1 in the object region R1 in FIG. 3, and the calculated difference is used for evaluating visibility. When a plurality of objects are present within a group, the difference in brightness (contrast) of an object representing the group is set as visibility of the group. For example, an object having an average value of the differences in brightness or the lowest difference in brightness is set as a representative.

The result of visibility evaluation is used to determine whether a symbol image is displayed (S16). When the brightness difference is below a predetermined threshold, that is, when the probability that an occupant recognizes the presence of the pedestrian P1 is low, a symbol image is displayed. By contrast, when the brightness difference is larger than a predetermined threshold, that is, when the probability that an occupant recognizes the presence of the pedestrian P1 is high, a symbol image is not displayed. A symbol image displaying a pedestrian is preliminarily stored in the memory 15.

The above configuration has a visibility determination section determining visibility group by group and, when visibility exceeds a predetermined state, the display control unit suppresses display of a symbol image corresponding to a group. This serves to suppress display of a symbol image unnecessary for an occupant, making the display region of a captured image wider than that in a conventional technique.

A symbol image is selected according to the type of an object. The symbol image is associated with the type and preliminarily stored in the memory 15. This configuration has the type determination section determining the type of an object or a group; the type is reflected in a symbol image, allowing an occupant to grasp what an object (such as a pedestrian and an animal) is.

The next processing calculates the occupancy in the display screen of the first display 31, of a symbol image determined to be displayed, that is, the ratio of the display area of all of symbol images to the area of the display screen (S17).

The Next processing performs display control as described below depending on the presence/absence of the second display 32. First, a display mode is determined on the basis of the occupancy (S21) either when any second display 32 is not included (S18: No) or when the second display 32 is included (S18: Yes) and, further, the occupancy does not exceed a predetermined threshold (S19: No). Subsequently, an image is displayed on the first display 31 in the determined display mode (S22).

The display mode is also referred to as a display format or a display manner and includes various specifications such as color, shape, size, and details related to display or design and also includes specifications related to a change with time of the various specifications of the display.

Figure 4:
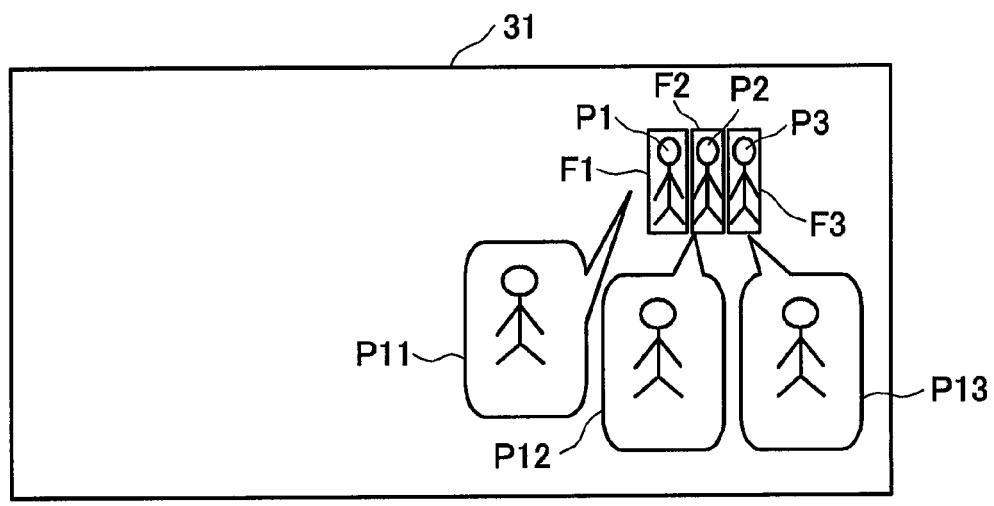
FIG. 4 is a diagram illustrating a display example as a comparison example.
Figure 5:
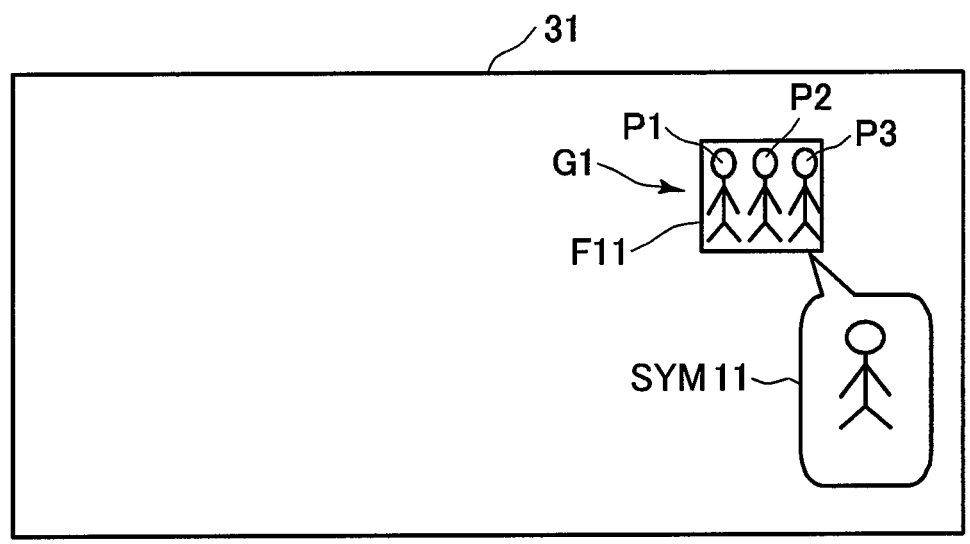
FIG. 5 is a diagram illustrating a display example in the embodiment.

Hereinafter, referring to FIGS. 4 to 7, the display mode in S21 will be described. FIG. 4 illustrates a display example, as a comparison example, in a conventional art, and FIG. 5 illustrates a display mode in the embodiment. The two diagrams display three pedestrians (P1 to P3) that are extracted as objects from a captured image.

In FIG. 4, even when objects are close to each other, the objects are surrounded by display frames (F1 to F3) and symbol images or enlarged images (P11 to P13) of the objects are displayed as balloons. Consequently, the images occupy a considerably large part in the display screen, and the overall situation of the captured image is not easily grasped.

By contrast, in FIG. 5, object regions corresponding to the three pedestrians (P1 to P3) are set as a group G1 and surrounded by one display frame F11, and only a symbol image SYM11 specific to the group G1 is displayed as a balloon near the image of the group G1. The parts, which are hidden by the symbol images P11 and P12 in FIG. 4 in the captured image, can be also displayed.

The display frame F11 is, for example, displayed so as to overlap the captured image as disclosed in JP 2010-108507 A. This is similarly applied to the other display examples.

Figure 6:
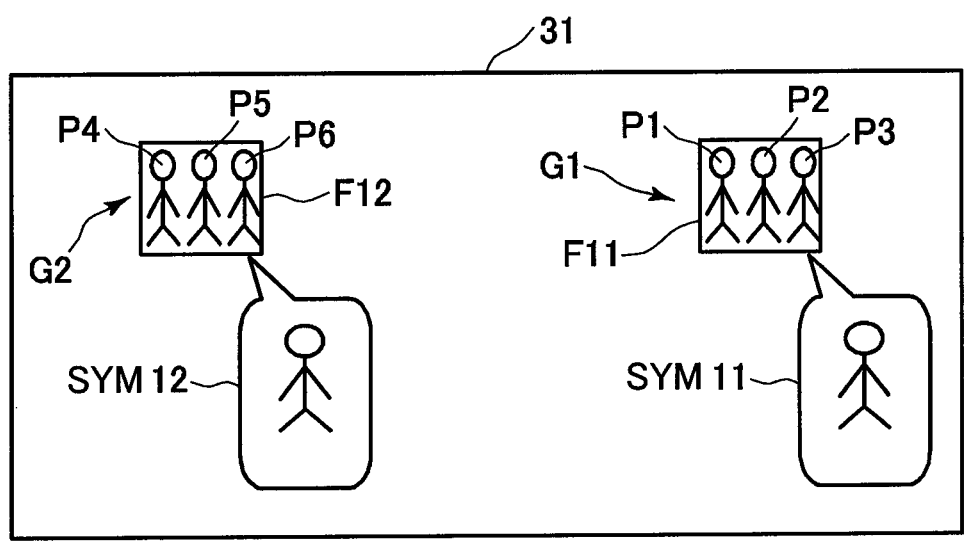
FIG. 6 is a diagram illustrating an example of displaying a plurality of groups in one display.

FIG. 6 illustrates a display mode when the display unit 30 includes only the first display 31. The group G1 obtained by grouping the pedestrians P1 to P3 and a group G2 obtained by grouping pedestrians P4 to P6 in a captured image are displayed so as to be surrounded by display frames F11 and F12, respectively, each of which surrounds the outer periphery of the group. Symbol images SYM11 and SYM12 corresponding to the two groups are displayed as balloons near images of the corresponding groups. The embodiment as well as a conventional art has a configuration to display all of symbol images as in FIG. 6 also in a state where visibility of the pedestrians P1 to P6 is low. Further, the conventional art has the configuration (refer to FIG. 4) to display symbol images of all of the object that resultantly occupy a large part of the display screen. By contrast, the embodiment has the configuration to display symbol images group by group, thereby suppressing the occupation area of the symbol images to the minimum.

Figure 7:
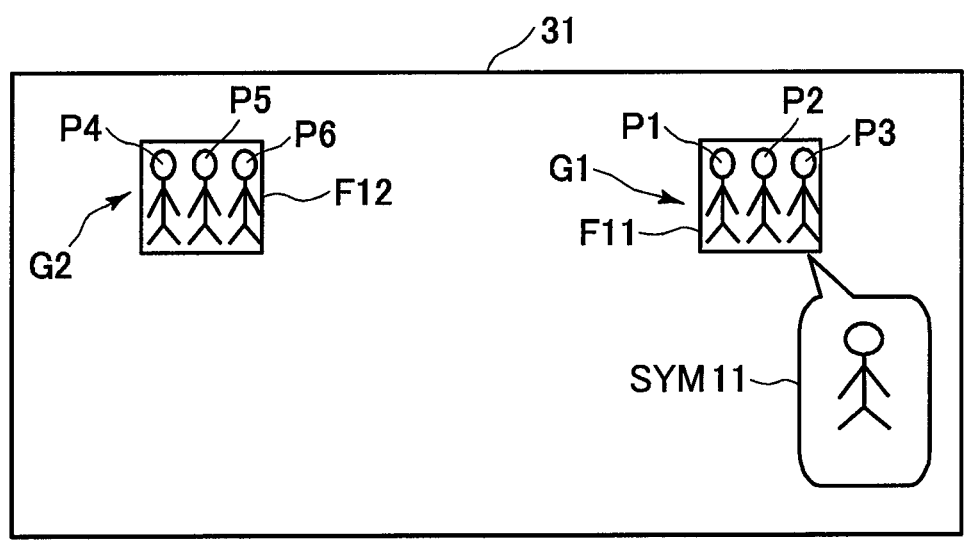
FIG. 7 is a diagram illustrating another example of displaying a plurality of groups in one display.

FIG. 7 illustrates another example of the display mode in a configuration where the display unit includes only the first display 31. Although FIG. 7 illustrates objects similar to those in FIG. 6, estimating visibility of each of groups results in difference in display from FIG. 6. That is, estimating that visibility of the group G2 is high leads to non-display of the symbol image S2, whereas estimating that the visibility of the group G1 is low leads to display of the symbol image S1. The imaging region can be thus displayed wider as compared with FIG. 6.

When the occupancy of the symbol images SYM11 and SYM12 exceeds a threshold in the display example of FIG. 6, display/non-display of a symbol image may be repeated in predetermined cycles. This case performs a control of display time of a symbol image so as to satisfy the following equation 1 per unit time. This control can make constant the ratio of occupation by a symbol image in space and time.

$$\text{(Symbol occupancy (occupancy area) in screen)} \times \text{(display time)} = \text{constant.} \qquad \text{Equation 1}$$

Figure 8A:
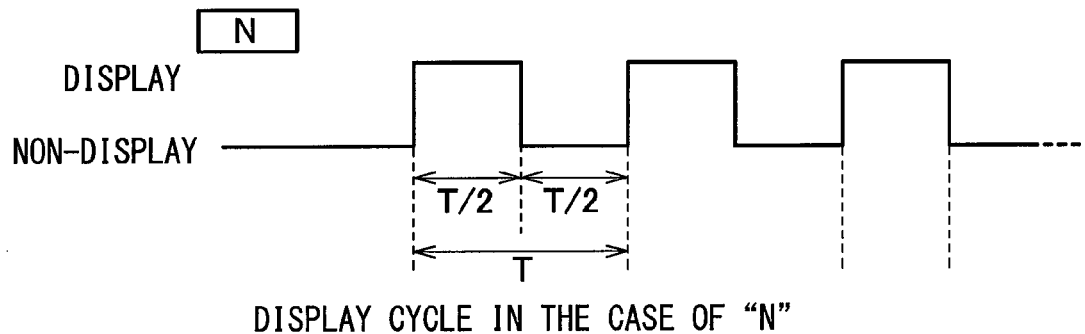
FIG. 8A is a diagram illustrating an example at a display time point of a symbol image.
Figure 8B:
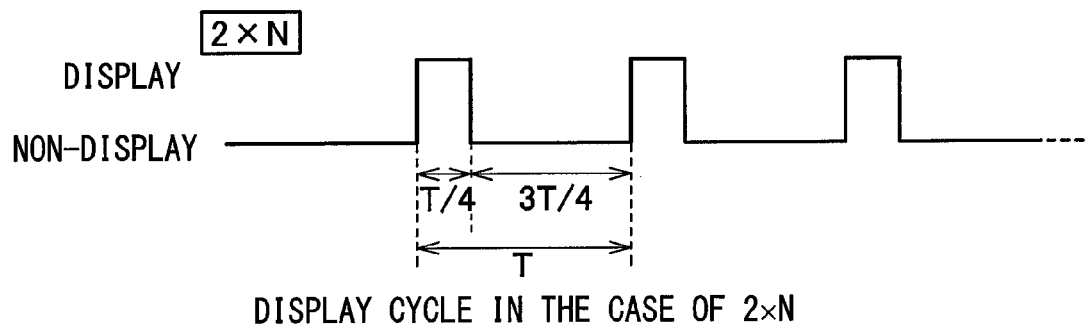
FIG. 8B is a diagram illustrating another example at a display time point of a symbol image.
Figure 8C:
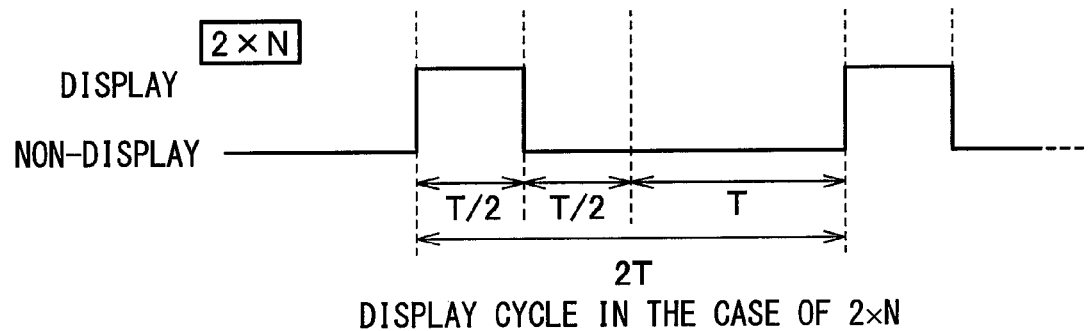
FIG. 8C is a diagram illustrating another example at a display time point of a symbol image.

FIGS. 8A to 8C illustrate an example of display time point of a symbol image when the number of symbols is N and when the number of symbols is 2×N. FIG. 8A is an example of a time chart illustrating display time and a display cycle of symbol images when the number of symbol images is N. The display cycle is also a cycle of blinking display and is constructed by one display continuation period and one non-display continuation period. This example displays, when it is assumed that the display cycle is T seconds, a symbol image for T/2 seconds which correspond to the half cycle. When the display area of one symbol image is set as S, the product of the occupation area as the sum of the areas of symbol images and display time in one cycle is expressed as (N×S)×(T/2).

FIG. 8B is an example of a time chart illustrating an example of display time and a display cycle of symbol images when the number of symbol images is 2×N. When the display cycle of the symbol images is set as T seconds in a manner similar to the case of FIG. 8A, the display time of the symbol images in FIG. 8B becomes ½ time of the case of FIG. 8A, that is, T/4 seconds.

FIG. 8C is, like FIG. 8B, an example of a time chart illustrating display time and a display cycle of symbol images when the number of symbol images is 2×N. The display time of the symbol images is set to T/2 seconds which is the same as that in the case of FIG. 8A. In this case, the display cycle of the symbol images becomes twice as long as that in the case of FIG. 8A, that is, 2×T seconds.

In the examples of FIGS. 8B and 8C, the occupancy of display regions of symbol images displayed, in the entire display region of the first display is calculated by an occupancy calculation section, and the display cycle is set in accordance with the calculated occupancy. When the number of symbol images increases, the display time of the symbol images is shortened (FIG. 8B) or the display cycle of the symbol images is increased (FIG. 8C). A situation of a region hidden by the symbol images can therefore be recognized while the symbol images are not displayed.

Preferably, the display cycle and the display time are set so that the product of the occupation area and display time of a symbol image per unit time becomes a predetermined value when the number of symbol images (that is, occupation area) changes.

Referring again to FIG. 2, when the configuration includes the second display 32 (S18: Yes) and the calculated occupancy exceeds a predetermined threshold (S19: Yes), a captured image is displayed in the first display 31 and a symbol image is displayed in the second display 32 (S20).

This configuration that is in the vehicle having the second display 32 in addition to the first display 31, provides the vehicular surrounding-monitoring control apparatus with the occupancy calculating unit which calculates occupancy of display regions of symbol images displayed, in the entire display region of the first display 31. When the occupancy exceeds a predetermined occupancy threshold, the display control unit displays the symbol images in the second display 32. Such configuration allows, if a plurality of displays are provided, an occupant to grasp the entire captured image and the situation of objects.

Figure 9A:
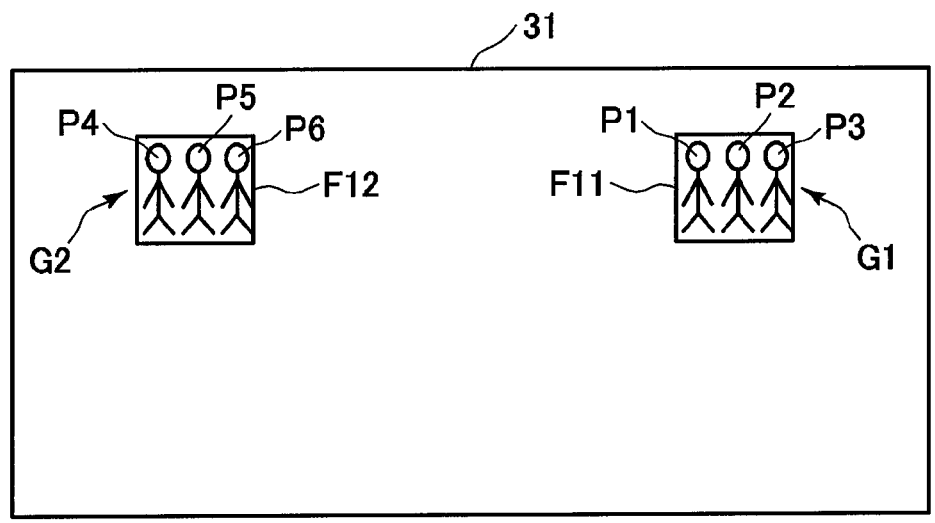
FIG. 9A is a diagram illustrating a display example of one display when two displays are used.
Figure 9B:
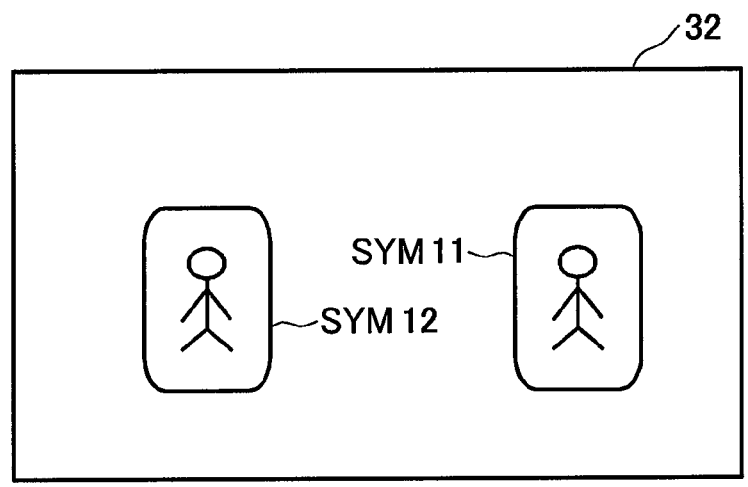
FIG. 9B is a diagram illustrating a display example of the other display when two displays are used.

FIGS. 9A and 9B illustrate a display example in the configuration including the second display 32 in S20 of FIG. 2. The first display 31 displays a group image G1 obtained by grouping pedestrians P1 to P3 and a group image G2 obtained by grouping pedestrians P4 to P6 so as to be surrounded by display frames F11 and F12, respectively. The second display 32 displays symbol images SYM11 and SYM12 corresponding to the group images G1 and G2. The display positions and position relations of the symbol images may be conformed to the display mode of the first display 31.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A vehicular surrounding-monitoring control apparatus in a vehicle having an imaging unit that captures an image of surrounding of the vehicle and a first display, the apparatus comprising:
    an extraction section extracting, as an object region, an image region corresponding to each object from a captured image obtained by the imaging unit;
    a determination section determining, when a plurality of object regions corresponding to a plurality of objects are extracted by the extraction section, whether the objects are coordinated into a group or not, based on types of the objects and positional relations between the object regions; and
    a display control unit displaying, when the objects are determined to be coordinated into the group, a symbol image that is specific to the group to be superimposed on the captured image in the first display, the symbol image expressing a presence of the group.

2. The vehicular surrounding-monitoring control apparatus according to claim 1, further comprising:
    a type determination section determining type of the object or the group,
    wherein the type is reflected in the symbol image.

3. The vehicular surrounding-monitoring control apparatus according to claim 1, wherein
    when, of the object regions, a first object region overlaps a second object region that is different from the first object region, the determination section determines that the objects are coordinated into the group.

4. The vehicular surrounding-monitoring control apparatus according to claim 1, wherein
    when interval between, of the object regions, a first object region and a second object region that is different from the first object region is lower than a predetermined threshold, the determination section determines that the objects are coordinated into the group.

5. The vehicular surrounding-monitoring control apparatus according to claim 4, wherein the threshold is determined according to size of the object region.

6. The vehicular surrounding-monitoring control apparatus according to claim 1, further comprising:
    a visibility determination section determining visibility specific to the group,
    wherein when the visibility exceeds a predetermined state, the display control unit restricts the displaying of the symbol image specific to the group.

7. The vehicular surrounding-monitoring control apparatus according to claim 1, wherein
    the display control unit displays the symbol image to blink in a predetermined display cycle.

8. The vehicular surrounding-monitoring control apparatus according to claim 7, further comprising:
    an occupancy calculation section calculating occupancy of a display region of the symbol image displayed, in an entire display region of the first display,
    wherein the display cycle is set according to the occupancy.

9. The vehicular surrounding-monitoring control apparatus according to claim 1, further comprising:
   an occupancy calculation section calculating occupancy of a display region of the symbol image displayed, in an entire display region of the first display,
   when the occupancy exceeds a predetermined occupancy threshold, the display control unit displays the symbol image in a second display that is additionally included in the vehicle to be independent of the first display.

* * * * *